United States Patent [19]
Eppler

[11] Patent Number: 5,953,886
[45] Date of Patent: Sep. 21, 1999

[54] FOOD AND PACKAGING MACHINE AND METHOD

[75] Inventor: Terry Eppler, Fenton, Mo.

[73] Assignee: Anchor Packaging, Fenton, Mo.

[21] Appl. No.: 08/906,082

[22] Filed: Aug. 5, 1997

Related U.S. Application Data

[60] Provisional application No. 60/023,196, Aug. 5, 1996.

[51] Int. Cl.⁶ .............................. B65B 7/28; B65B 51/10
[52] U.S. Cl. .......................... 53/478; 53/296; 53/389.3; 53/441; 53/556
[58] Field of Search .............................. 53/478, 441, 556, 53/296, 290, 373.6, 389.3, 389.4, 389.2

[56] References Cited

U.S. PATENT DOCUMENTS

| | | | |
|---|---|---|---|
| 4,583,348 | 4/1986 | Treiber et al. | 53/441 |
| 4,705,588 | 11/1987 | Treiber | 53/441 |
| 4,958,479 | 9/1990 | Treiber | 53/441 |
| 5,259,170 | 11/1993 | Tolson | 53/441 |
| 5,603,198 | 2/1997 | Rimondi et al. | 53/441 |

*Primary Examiner*—James F. Coan
*Attorney, Agent, or Firm*—Suelthaus & Walsh PC

[57] ABSTRACT

A food packaging machine and a method of food packaging with which food can be put into a container, and a film heat sealed to the container to cover the top of the container.

20 Claims, 12 Drawing Sheets

| KEY NO. | PART NO. | QTY | DESCRIPTION |
|---|---|---|---|
| 1 | 024004 | 1 | SILICONE ROLLER |
| 2 | 030006 | 1 | HEATER SHAFT |
| 3 | 006002 | 2 | HEATER END CAP |
| 4 | 006003 | 2 | CARBON BUSHING |
| 5 | 011000 | 1 | 1" SHAFT COLLAR |
| 6 | 013000 | 1 | ELBOW, 3/4" |
| 7 | 013001 | 1 | 1/2" SEALTIGHT CONDUIT |
| 8 | 013002 | 2 | 1/2" SEALTIGHT FITTING |
| 9 | 013003 | 1 | THREAD REDUCER |
| 10 | 015014 | 1 | CAST-IN HEATER |
| 11 | 033000 | 1 | THERMOCOUPLE |
| 12 | 037005 | 2 | HEATER WIRES |
| 13 | 049010 | 1 | #10 LOCK WASHER |
| 14 | 050018 | 1 | #10-24x1-1/2" R.H.M.S. |
| 15 | 050012 | 4 | 1/4"-20x1-1/2" H.H. BOLT |
| 16 | 049001 | 5 | 1/4" LOCK WASHER |
| 17 | 050009 | 1 | 1/4"-28x1-1/4" H.H. BOLT |
| 18 | 021011 | 2 | 3/16"x1" ROLL PIN |
| 19 | 032018 | 3 | HEATER SHAFT SPACER |

SOLID STATE TEMPERATURE CONTROLLER

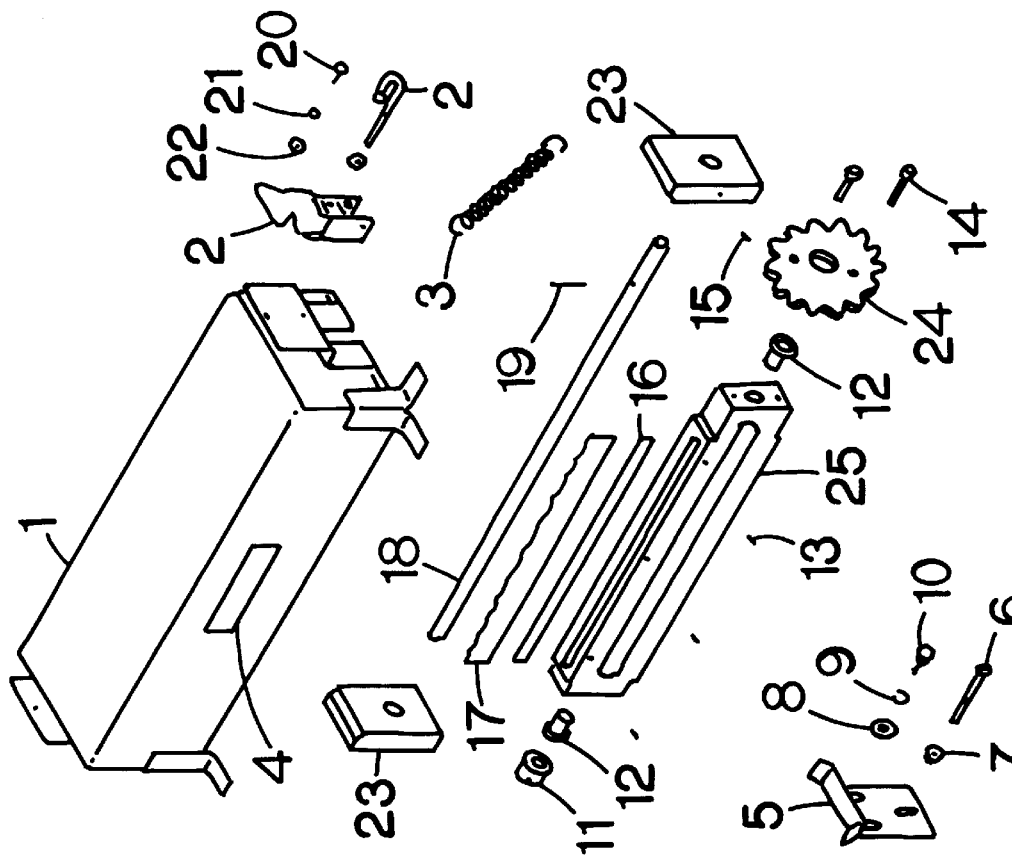

| KEY NO | PART NO. | QTY | DESCRIPTION |
|---|---|---|---|
| 1 | 012010 | 1 | ROTATING CUTTER COVER |
| 2 | 010026 | 2 | CUTTER COVER LATCH |
| 3 | 027006 | 2 | CUTTER HOLD DOWN SPRING |
| 4 | 044006 | 1 | DECAL |
| 5 | 004031 | 2 | CUTTER SUPPORT BRACKET |
| 6 | 021005 | 2 | SPRING STUD |
| 7 | 048004 | 2 | 1/4-20 HEX. NUT S.S |
| 8 | 049002 | 4 | 1/4" FLATWASHER |
| 9 | 049001 | 4 | 1/4" LOCKWASHER |
| 10 | 050003 | 4 | 1/4-20 /X1/2" HEX HEAD BOLT S.S. |
| 11 | 011004 | 1 | 3/8" SHAFT COLLAR |
| 12 | 006007 | 2 | ROTATING CUTTER BUSHING |
| 13 | 050041 | 6 | #10-24 x 3/8" SOCKET HEAD SET SCREW |
| 14 | 050040 | 2 | 1/4-20 x 1/2" SOCKET HEAD |
| 15 | 050021 | 2 | 1/4-20 x 1/4" SOCKET HEAD |
| 16 | 032006 | 2 | BLADE SPACER |
| 17 | 003012 | | BLADE |
| 18 | 030013 | 1 | ROTATING CUTTER SHAFT |
| 19 | 011004 | 4 | ROLL PIN 1/8" x 3/4" |
| 20 | 050024 | 4 | #6-32 x 3/8" ROUND HED MACHINE SCREW S.S. |
| 21 | 049008 | 4 | #6 LOCKWASHER |
| 22 | 048012 | 4 | |
| 23 | 051007 | 2 | CUTTER SUPPORT BLOCK FOR 3 1/2" AND 7" CUTOFF |
| 23 | 051008 | 2 | CUTTER SUPPORT BLOCK FOR 4" CUTOFF |
| 23 | 051009 | 2 | CUTTER SUPPORT BLOCK FOR 5" CUTOFF |
| 24 | 031008 | 1 | 40-A14 SPROCKET FOR 3 1/2" AND 7" CUTOFF |
| 24 | 031011 | 1 | 40-A16 SPROCKET FOR 4" CUTOFF |
| 24 | 031007 | 1 | 40-A20 SPROCKET FOR 5" CUTOFF |
| 25 | 003009 | 1 | ROTATING CUTTER FOR 3 1/2" AND 7" CUTOFF |
| 25 | 003010 | 1 | ROTATING CUTTER FOR 4" CUTOFF |
| 25 | 003011 | 1 | ROTATING CUTTER FOR 5" CUTOFF |

FIG.3A.

FOOD AND PACKAGING MACHINE AND METHOD

This application claims Benefit of provisional application Ser. No. 60/023,196 filed Aug. 5, 1996.

The present invention relates in general to food packaging machinery and methods of food packaging and pertains, more particularly, to improvements in conventional food packaging equipment and methods of food packaging. The food packaging machine of this invention is an improvement over conventional film sealing, film cutting and food container packaging features of known food packaging machines.

With the conventional food packaging machine there is often a difficulty in maintaining food freshness over a period of time, a drawback that may be overcome when the food is placed in a heat sealed container. The drawback of pilferage may be avoided with heat sealed food packages since a previously sealed food package in which the previously sealed film is torn or pulled back is easily detected.

Accordingly, an object of the present invention is to provide an improved food packaging machine that is constructed for relatively quick and efficient operation. It is intended for an operator of the improved food packaging machine of the present invention to realize efficiencies and economies of labor time through the use of the machine of the present invention.

Another object of the present invention is to provide an improved food packaging machine that provides a tight seal. The tight seal attained by a properly operated food packaging machine of the present invention results in an improvement in the freshness and taste of the food and should, therefore, keep the food from deteriorating by contact with the air.

A further object of the present invention is to provide an improved food packaging machine that reveals tampering. Tampering with a seal formed by the heat sealed film of the present invention is readily observable in some instances by mere visual inspection of the film seal.

Still another object of the present invention is to provide an improved food packaging machine and an improved packaging method that is constructed and used at low costs compared to conventional packaging machines heretofore unattainable except with packaging machines that may cost three or four times the cost of the food packaging machine of the present invention.

To accomplish the foregoing and other objects of this invention there is provided a food packaging machine and method for packaging food in film sealed containers. The food packaging machine comprises a sealing system, a rotating cutter, raised rim pockets, extended pin chains, film core support, film path and film tension control and exit ramps for packaged and film sealed food containers.

These and other objects and features of the present invention will be better understood and appreciated from the following detailed description of an embodiment thereof, selected for purposes of illustration and shown in the accompanying drawings.

FIG. 3A is an exploded view and detailed parts list of the rotating cutter and cover guard assembly illustrated in FIG. 3;

Figure 1:
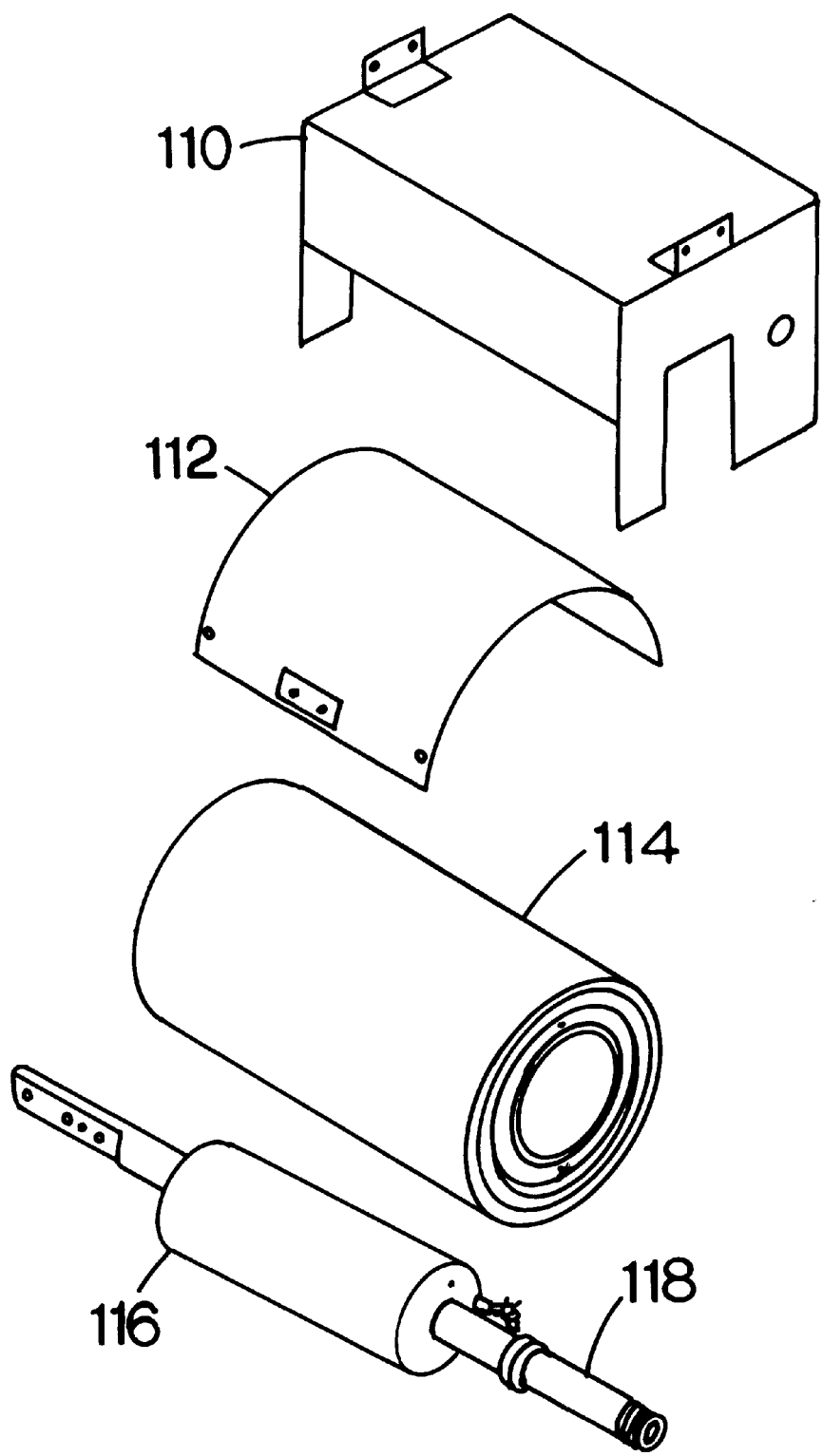
FIG. 1 is an exploded view of an embodiment of a combination roller and heater shaft and radiant heater located within a radiant heater cover of the present invention.

Referring now to the drawings there is shown a preferred embodiment of the food packaging machine and method of packaging food in containers of this invention. The food packaging machine and the method of packaging food is described in connection with a food packaging application to heat seal a film (also referred to as lidding or lidding film) to a container usually filled with a food of some sort.

The food packaging machine and the food packaging method of the present invention is particularly adapted for heat sealing a suitable film over the top of an open top food container. The present invention is characterized by a continuously operating food packaging machine including a conveyor mechanism for transporting containers through the food packaging process and method of the present invention.

The drawings show the food packaging machine in conjunction with a food container transported through the machine by a means for conveying the container through the food packaging machine of the present invention. The present invention may be considered under the general categories of SEALING SYSTEM, ROTATING CUTTER, RAISED-RIM POCKETS, EXTENDED PIN CHAIN CONVEYOR, FILM CORE SUPPORT, FILM PATH AND FILM TENSION AND EXIT RAMPS.

I. SEALING SYSTEM (FIGS. 1, 1B, 1C, 2)

A sealing system portion of the present invention includes an internal cast-in-heater that is controlled by a solid state temperature controller (not shown in detail). In a preferred embodiment illustrated in the drawings figures, an aluminum roller with silicone rubber bonded to it surrounds the heater (FIG. 1).

The silicone roller and cast-in-heater are mounted on a heater shaft. The heater is stationary and the silicone roller rotates around the heater shaft.

In addition to the internal heater an external radiant heater (FIG. 2) is provided to increase the surface heat of the roller. This is intended to and is believed to improve the seal between the film and the plastic container (not shown) which is received by a container pocket.

The heater is supported in one preferred embodiment as illustrated in the drawing figures and described below. Where part numbers are specifically referred to reference should be made to the parts or key lists included on the relevant drawings figures.

The internal cast-in heater is mounted on a shaft (Part 2, FIGS. 1, 1B and 1C) This shaft is held in place by uprights (not shown) which are bolted to the side panels of the food packaging machine or by other suitable framework members.

Figure 1B:
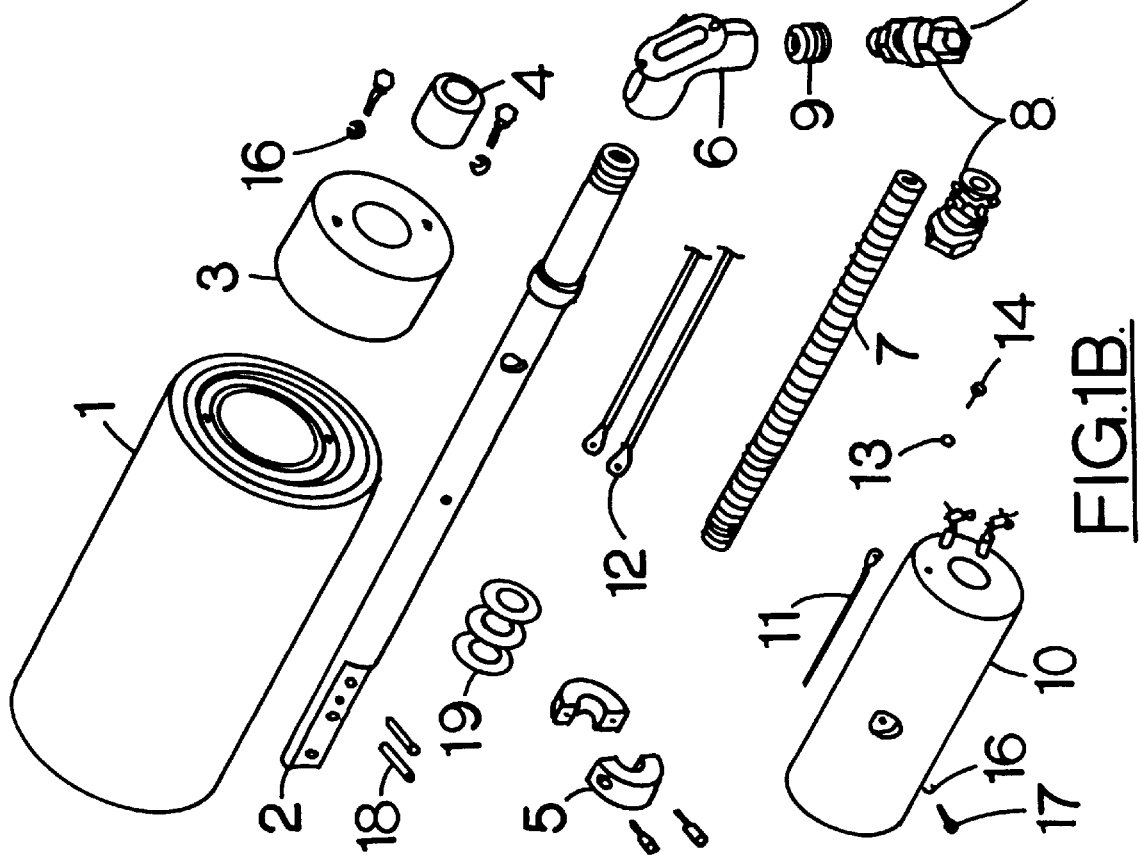
FIG. 1B is an exploded view and detailed parts list of the combination roller and heater shaft illustrated in FIG. 1.
Figure 1C:
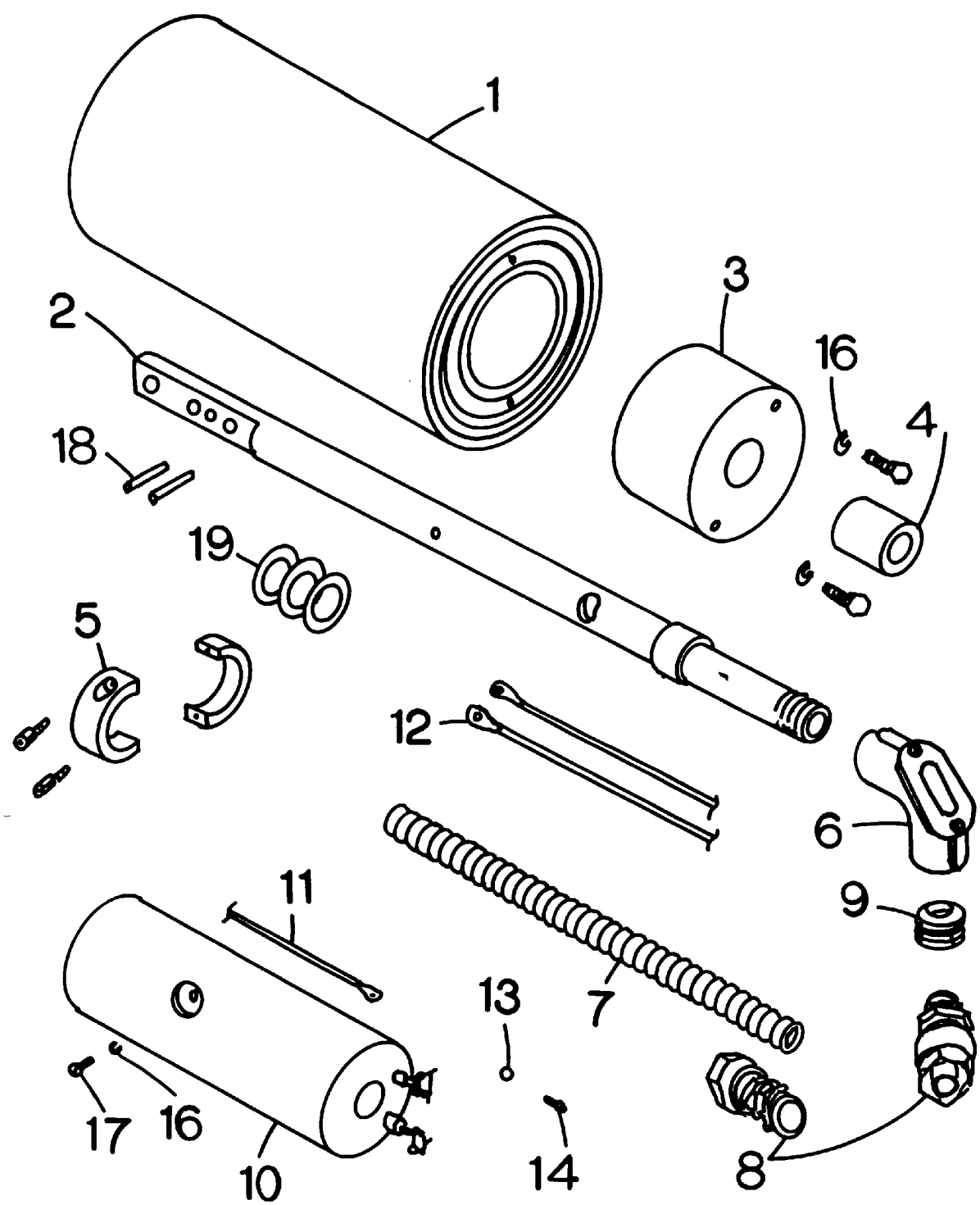
FIG. 1C is a larger scale exploded view and general parts list of the combination roller and heater shaft illustrated in FIG. 1.

The aluminum roller covered with silicone rubber (a preferred embodiment) is installed over the cast-in heater and is held in place with end caps and bearings (FIGS. 1, 1B and 1C). In operation, the shaft remains stationary and the roller rotates around the cast-in heater.

Figure 2:
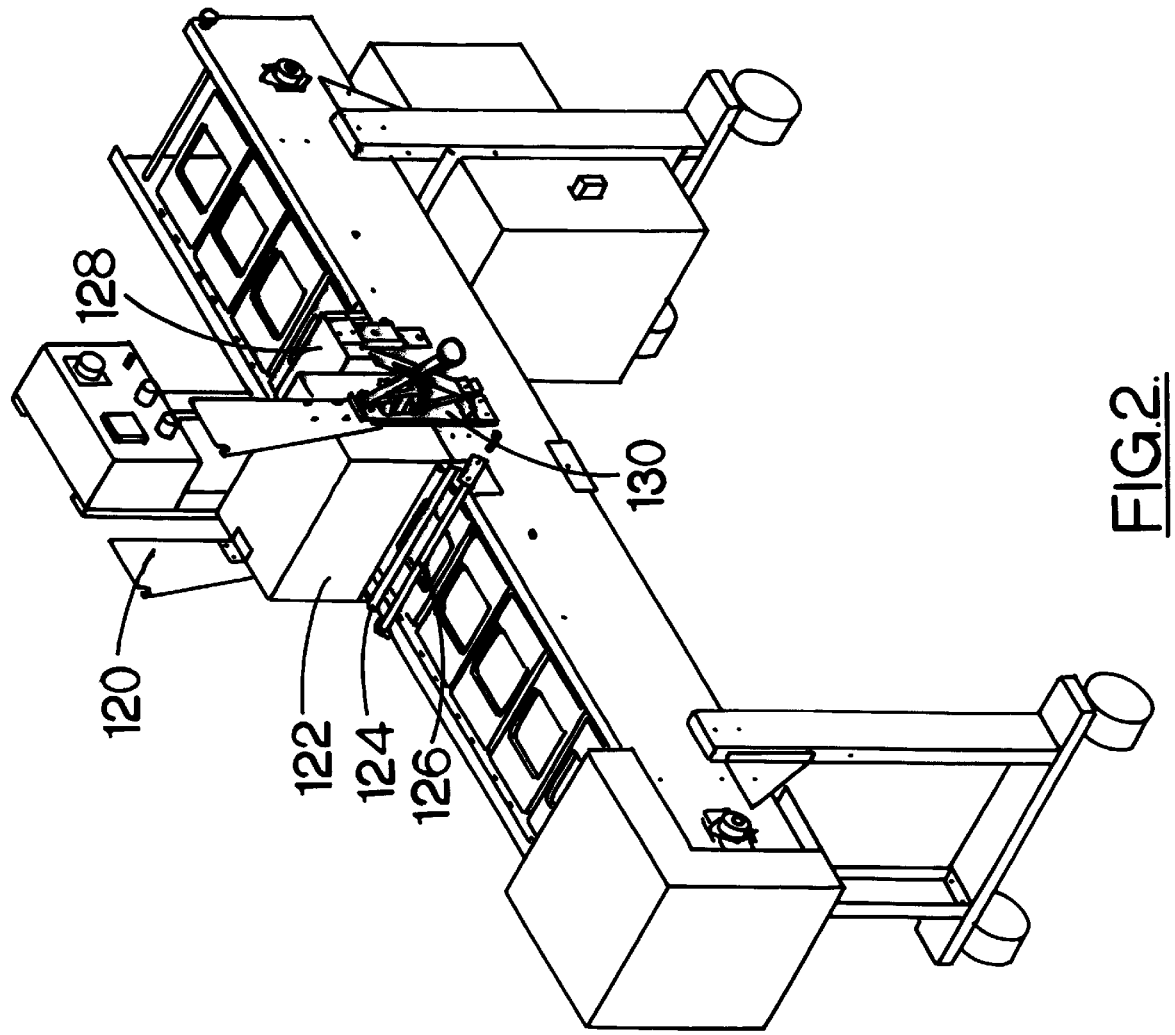
FIG. 2 is a perspective view of an embodiment of a food packaging machine constructed in accordance with the present invention.

The outer radiant heater is mounted in a cover. This cover is installed over the silicone roller and sits on the side panels of the machine (FIG. 2).

II. ROTATING CUTTER (FIGS. 2, 3, 3A, 4, 5, 6, 7)

Figure 7:
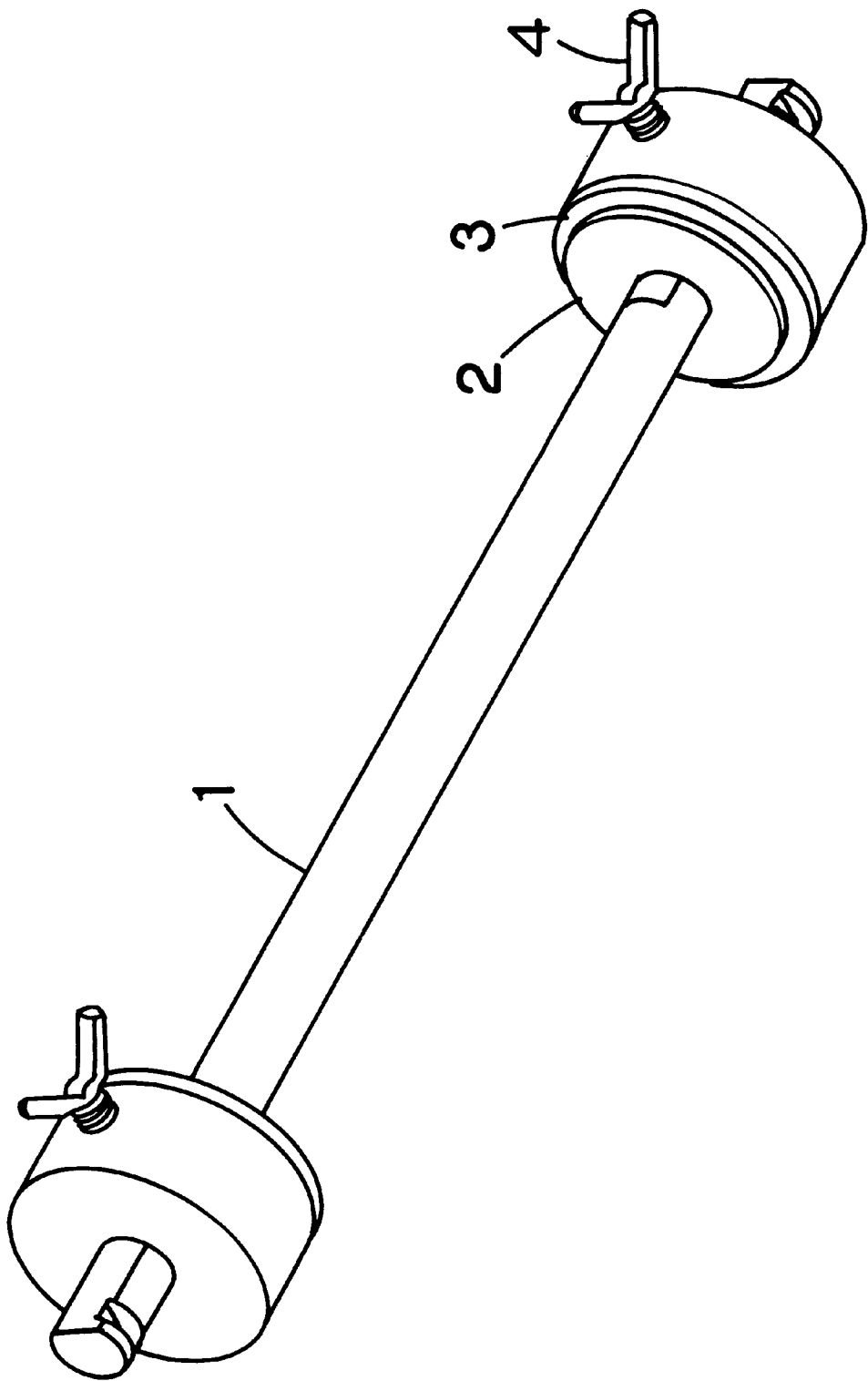
FIG. 7 is a perspective view of an embodiment of a film support shaft assembly of the present invention.

During operation of the method of the present invention, typically one or more containers (not shown) are sealed with a suitable lidding film (not shown). The lidding film is supported by a film support shaft (FIG. 7).

Figure 5:
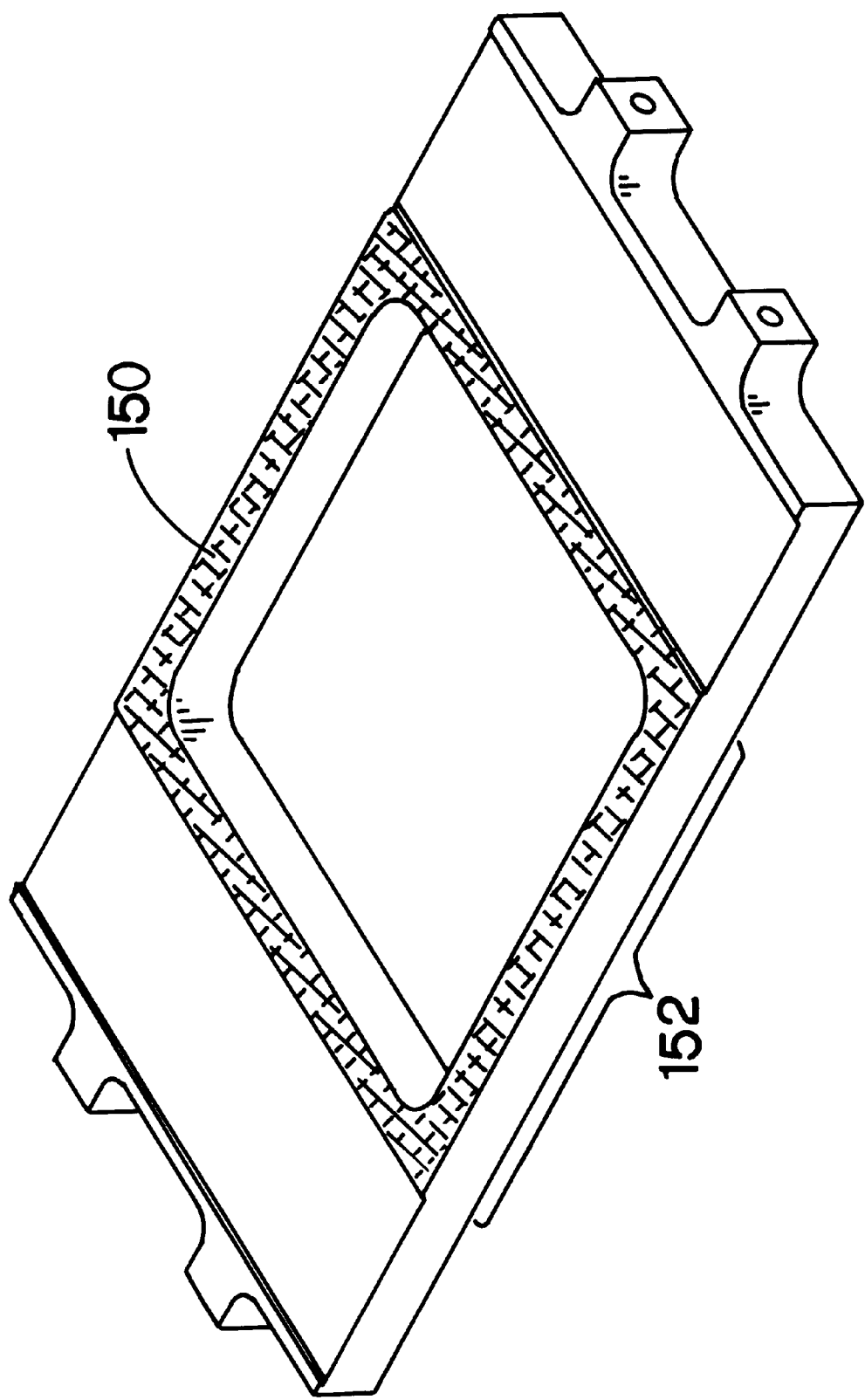
FIG. 5 is a perspective view of an embodiment of a container pocket of the present invention.

In a typical operation of the present invention, the containers (not shown) are placed in their respective receiving container pockets (FIG. 5). The lidding or film (not shown) is applied and heat sealed to the containers as they pass underneath in the pockets and connected to the extended pin chain conveyor (FIG. 6) as described below.

Figure 3:
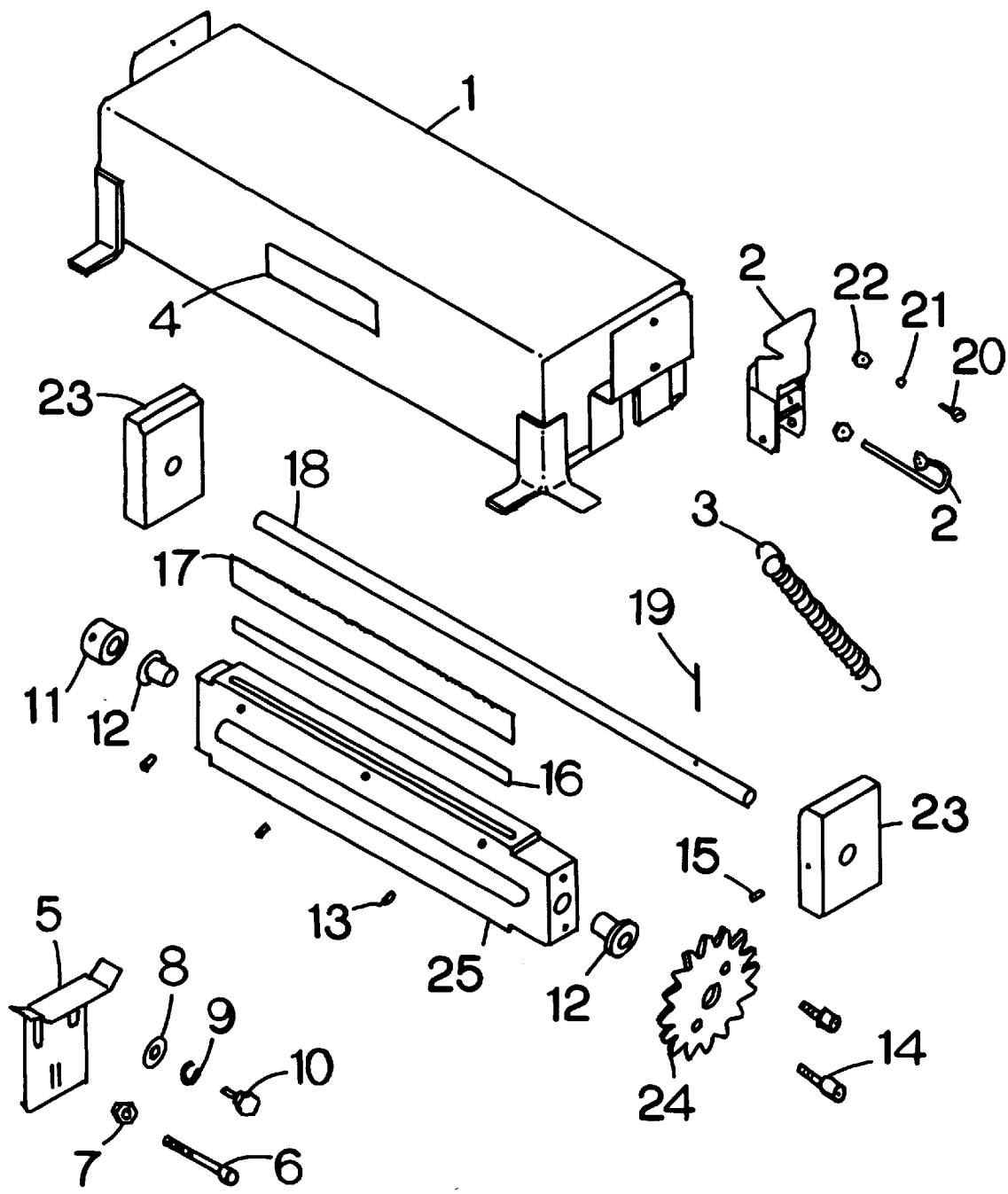
FIG. 3 is an exploded view of an embodiment of a rotating cutter and cover guard of the present invention.
Figure 4:
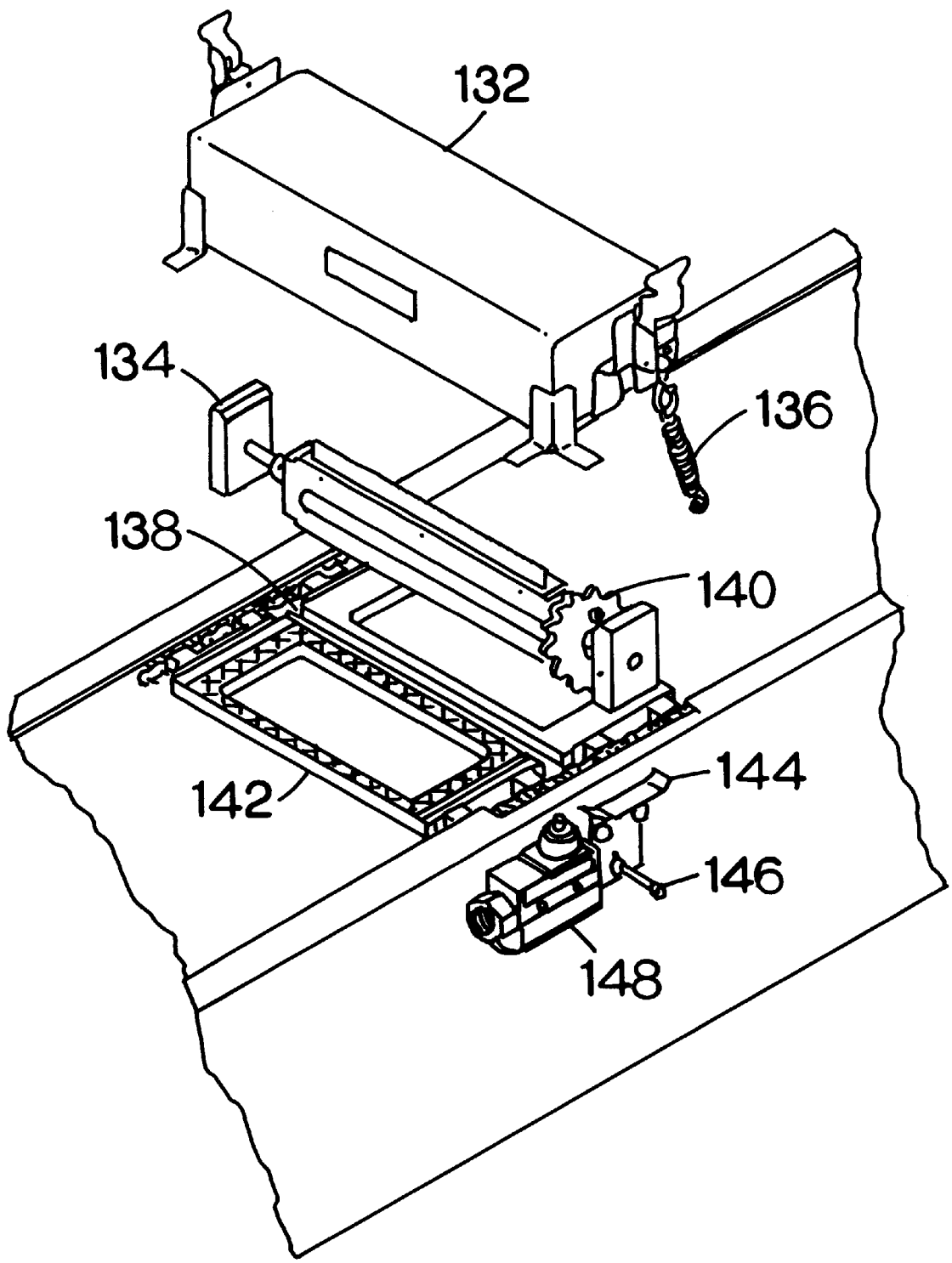
FIG. 4 is an exploded view of an embodiment of a rotating cutter assembly and interchangeable container pockets of the present invention.

The lidding or film that has been applied to the containers is cut apart between containers by a rotating cutter (FIGS. 3, 3A, 4). The rotating cutter is positioned just past the sealing system (FIG. 2).

In one preferred embodiment illustrated in the drawing figures, the rotating cutter assembly is composed of a cutting blade (Part 17, FIG. 3) which is attached to one end of a blade holder and the cutting blade is driven by a conveyor chain. It will be understood that the number of teeth on a conveyor chain sprocket will determine the length of the lidding film between the film separations created by the cuts of the cutter assembly cutting blade.

Selecting an appropriate sprocket size (e.g., diameter, number of teeth, etc.) results in the cutter assembly severing the lidding film such that a desired length of lidding film is attached to each container based upon the size of the container. Changing sprocket size or number of teeth provides a relatively easy way to change the length of lidding film applied to the containers between the cuts of the cutting blade of the cutter assembly.

The cutter assembly is held down by springs (Part 3, FIGS. 3, 3A, 4) on a cutter cover (Part 1, FIGS. 3, 3A, 4). These springs act to maintain a constant pressure on the rotating cutter and also enables the packaging machine operator to quickly remove and replace or otherwise change cutters.

The rotating cutter assembly is held in place by a rotating cutter cover (Part 1, FIGS. 3, 3A, 4) which is fastened to the machine through the use of spring loaded over center clamps (Parts 2 and 3, FIGS. 3, 3A). In a preferred embodiment of the present invention the rotating cutter assembly is provided with means for detecting and reacting if a jam occurs.

If a jam occurs while running the machine, the springs allow the cutter cover to lift up. This triggers a micro switch and stops the chain drive before damage to the machine occurs.

III. RAISED RIM POCKETS (FIGS. 2, 4, 5, 6)

Figure 6:
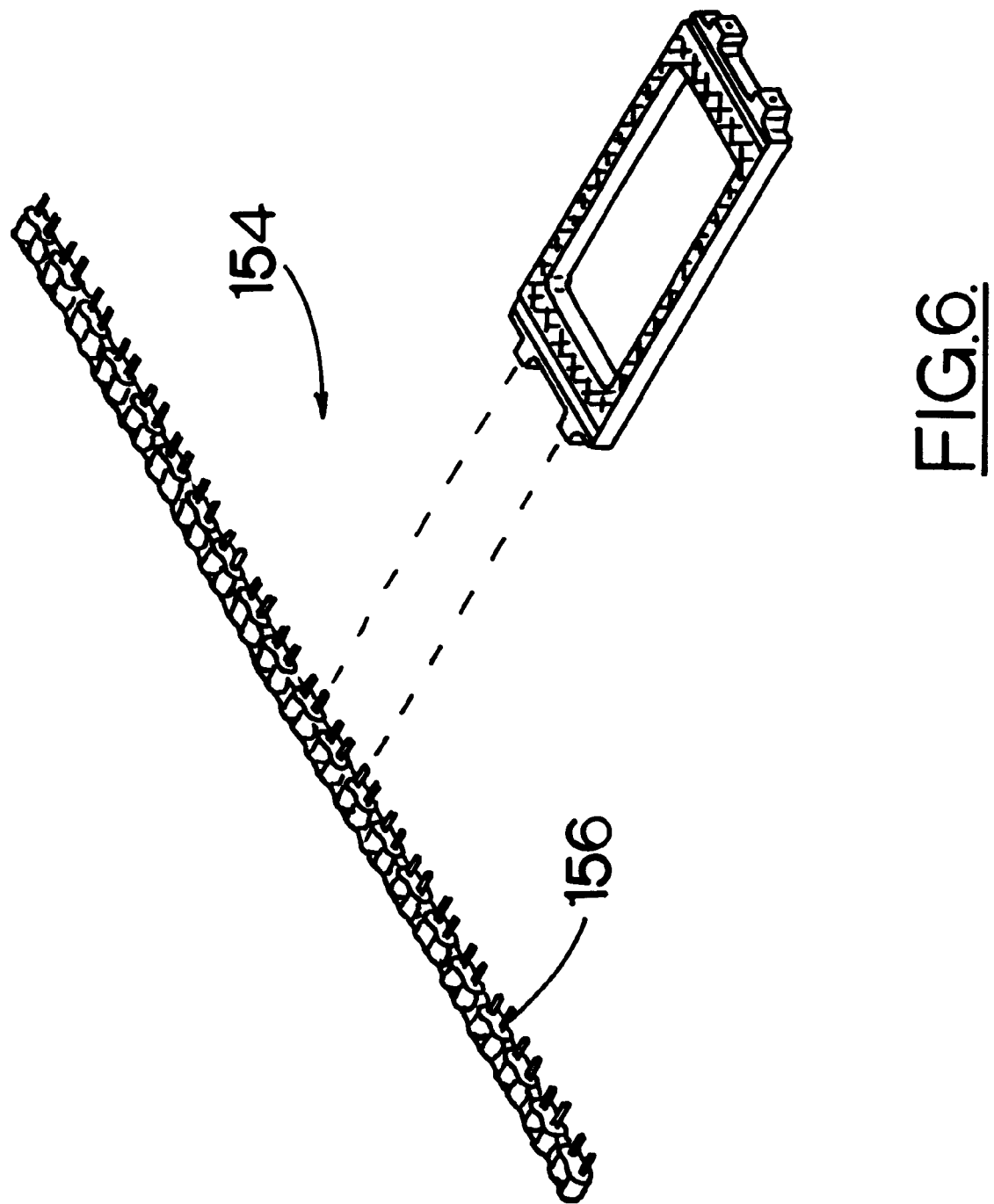
FIG. 6 is an exploded view of an embodiment of a container pocket and extended pin chain of the present invention.

In a preferred embodiment of the present invention the raised rim pocket for holding a container includes a raised rim around a pocket opening. In the illustrated embodiment the raised rim is machined around the container receiving opening in the pocket (FIGS. 4, 5, 6).

The raised rim of the pocket is intended to support a flange of the food container (not shown) that rests in the container pocket. The raised rim supports the flange of the container while the lidding film is sealed to the flange of the container (e.g., plastic) during operation of the process of the present invention.

It is desired to create a seal suitable for a sealed container of packaged food. The raised rim provides an area on which to concentrate the sealing pressure of the internally heated silicone roller so as to provide the desired seal between the lidding film and the food container.

IV. POCKETS and EXTENDED PIN CHAIN (FIGS. 2, 4, 5, 6)

The container pockets are loaded into the food packaging machine of the present invention and attached to the extended pin chain conveyor in order to transport the pockets with their food containers through the packaging machine. In a preferred embodiment of the present invention the container pockets are connected to the extended pin chain conveyor by lining up the holes in extended ends of the container pocket with pins extending out from the conveyor chain.

This system enables the operator to quickly change pockets from one size to another. An exploded view of the preferred embodiment is illustrated in FIG. 6.

V. FILM CORE SUPPORT (FIGS. 2, 7)

A film (e.g., lidding film for heat sealing to food packaging containers) core support system is provided. One objective of the film core support system is to enable an operator of the food packaging machine of the present invention to quickly change film sizes, thereby maintaining efficient operation of the present invention.

In a preferred embodiment illustrated in the drawing figures only two (2) wing nuts (Part 4, FIG. 7) can be used and constructed such that they are loosened in order to change the film, center the film or add tension to the film. The film support shaft assembly and its components are illustrated in FIG. 7 which also illustrates some of the components that make up the assembly.

The "O" rings (Part 3, FIG. 7) are provided to impart tension to the film core inserts by moving the core inserts (Part 2, FIG. 7) in or out and along the film shaft (Part 1, FIG. 7). Thus, for example, wrinkles in the film can be eliminated by increasing or decreasing tension on the core of a film roll (not shown) carried by the film shaft and between the core inserts.

The film core support in the preferred embodiment illustrated in the drawings is located proximate to and above the heater and cutter assemblies of the film packaging machine of the present invention. FIG. 2 shows the location of the support assembly on the machine without the film core support in place.

The supports for the film core support assembly are identified and illustrated in FIG. 2. One skilled in the food packaging industry will understand how the film core support shaft with its notches are supported are supported by the frame or other structure of the film packaging machine of the present invention.

In the illustrated embodiment the film core support shaft is stationary. The tensioned film and core rotate on the stationary film core support shaft.

VI. PATH OF FILM AND FILM TENSION (FIGS. 2, 7)

In operation, in connection with a food packaging application to heat seal a film to a container, a roll of sealing (e.g., lidding) film and associated film core are placed on the film support shaft (Part 1, FIG. 7). The film core supports (Part 2, FIG. 7) are installed into the ends of the film core of the film supported by the film support shaft.

The film and film core are centered on the film support shaft and the wing nuts are tightened to fix the position of the respective film core inserts. The film support shaft and the film that it carries are placed into the support brackets (FIG. 2) such that the film preferably unwinds from the top of the film roll.

Initially, film is unrolled from the film core and then threaded between a film shaft guide and a safety bar located upstream of the sealing roller and then down over the containers (not shown) which are located in their respective pockets as illustrated in FIG. 2. Tension is applied to the film through the use of rubber "O" rings.

The "O" rings exert pressure on the film core depending upon how much pressure is applied through the associated core inserts (Part 2, FIG. 7). Thus, desired film core tension and, therefore, film tension is obtained through the friction created between the rubber "O" ring and the typically cardboard film core supported by the film support shaft.

In one preferred embodiment illustrated in the drawings, approximately eight (8) inches of film is threaded between the film shaft guide and the safety bar located upstream of the sealing roller and then down between the pockets and towards the sealing roller. Thus, when the food packaging machine of the present invention is started, the film is carried under the heated roller by the pockets and then trimmed by the rotating cutter.

VII. EXIT RAMPS (FIGS. 2, 8, 9)

The covered and sealed containers (e.g., food containers) are removed from their respective pockets upon completion of the covering and sealing process. The final step in the process of the present invention is the removal of the containers by the food packaging machine of the present invention.

Figure 8:
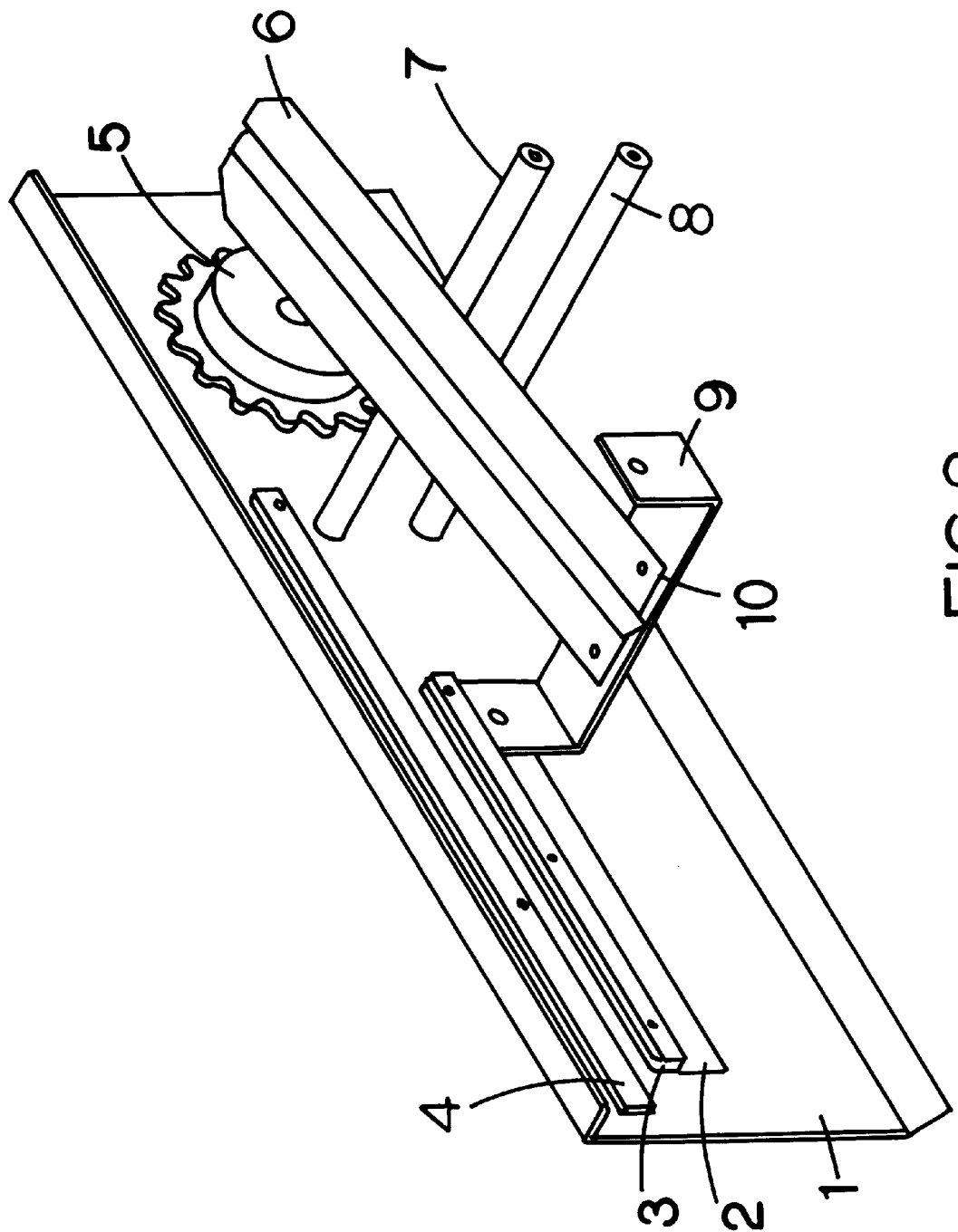
FIG. 8 is a perspective view of an embodiment of an exit ramp of the present invention.

In a preferred embodiment of the present invention illustrated in the accompanying drawings the discharge of the now sealed containers is accomplished by a ramp chute (Part 6, FIG. 8). The exit ramp chute located at the end of the food packaging machine is constructed so as to lift each container from its respective raised rim pocket as it is transported by the associated extended pin conveyor.

Figure 9:
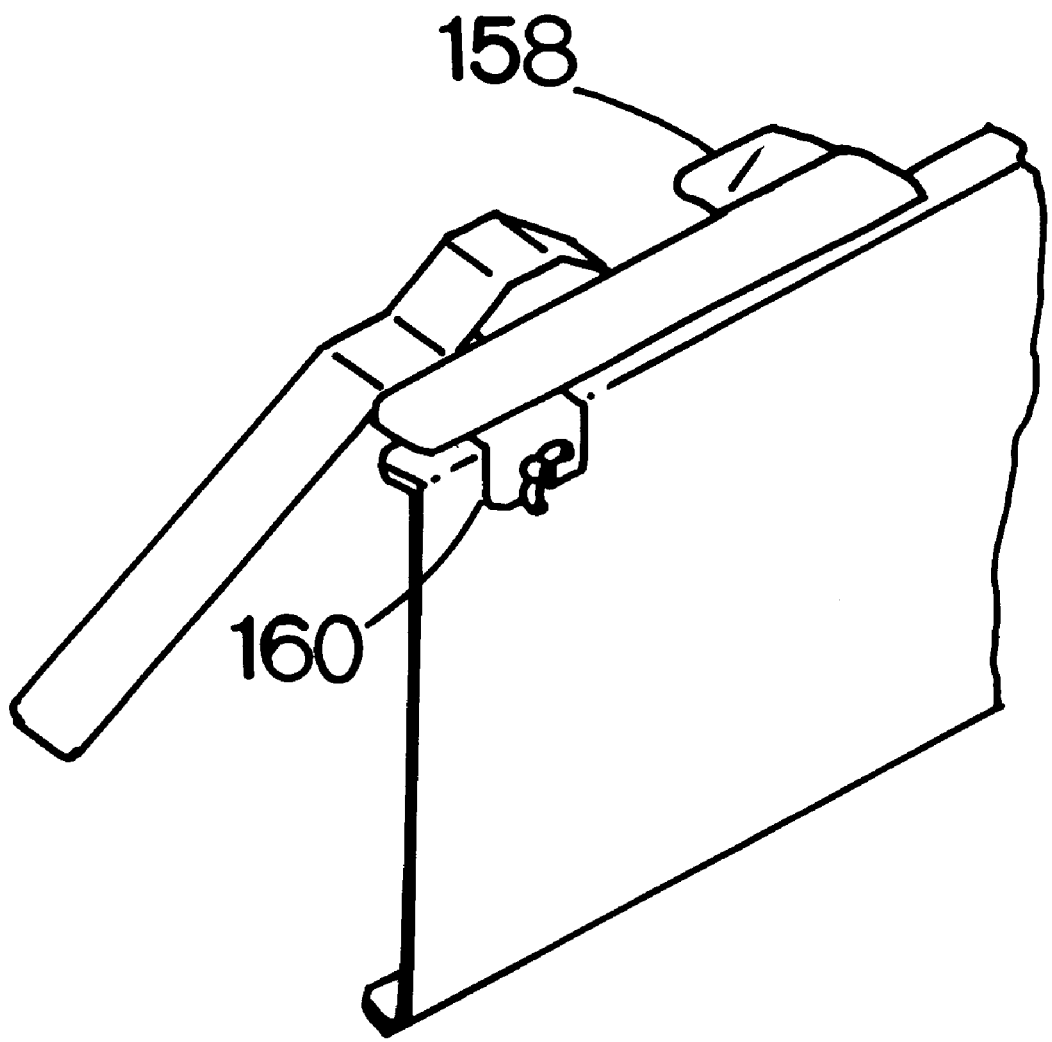
FIG. 9 is a perspective view of an installation of an embodiment of the exit ramp of the present invention.

Each sealed container is lifted out of its pocket and onto a ramp (FIG. 9). The ramp carries each sealed container to the end of the machine to complete the process of the present invention (as further described in FIGS. 8 and 9).

While specific embodiments have been shown and described, many variations are possible. The particular shape and size of the container pockets, including the shape and location of the raised rim portion or whether a raised portion is needed (which may depend upon the type or size of container used) may be varied to suit a particular container to be sealed.

The container and film material are variable and the food packaging machine of the present invention, including materials and specific component construction, may be varied to suit a particular container sealing requirement. Also, the material used to construct the heater roller and radiant heater may be varied to suit a particular sealing requirement.

While a preferred film support shaft, tensioning assembly and exit ramp assembly have been shown, it will be understood that variations may be constructed that are within the scope of the present invention. This also applies to variations or modifications to the machine of the present invention which may be accomplished to provide variations to the machine of the present invention.

The shape and construction, including materials, of the various components illustrated may be varied to suit a particular machine or process requirement. While some parts and components are illustrated it will be understood that not all of the parts or components that may be used to construct the present invention are listed and illustrated as it will be within the ability of one skilled in the art to vary or provided the necessary components for an operable machine of the present invention capable of performing the steps of the process of the present invention.

Having described the invention in detail, those skilled in the art will appreciate that modifications may be made of the invention without departing from its spirit. Therefore, it is not intended that the scope of the invention be limited to the specific embodiment illustrated and described, rather, it is intended that the scope of the this invention be determined by the described invention and its equivalents.

What is claimed is:

1. A food packaging machine, comprising:
   means for retaining a food package for sealing;
   means for transferring the means for retaining the food package for sealing through the food packaging machine;
   means for heat sealing a food package, including an internally heated roller and an external heater;
   means for cutting the means for heat sealing the food package, the means for cutting the means for heat sealing the food package located so as to separate the means for heat sealing the food package intermediate the means for retaining the food package for sealing;
   means for tensioning the means for heat sealing the food package; and
   means for removing a heat sealed food package from the food packaging machine.

2. A method of sealing a food package, the method comprising the steps of:
   placing a food package in a means for retaining the food package for sealing;
   heat sealing the food package with means for heat sealing the food package;
   rotating a rotating cutter for cutting the means for heat sealing the food package following heat sealing;
   tensioning the means for heat sealing the food package; and
   removing a heat sealed food package.

3. A food packaging machine as set forth in claim 1 wherein the means for cutting the means for heat sealing the food package comprises a rotating cutter.

4. A food packaging machine as set forth in claim 3 wherein the rotating cutter comprises a cutting blade attached to a blade holder.

5. A food packaging machine as set forth in claim 4 wherein a conveyor chain drives the blade holder and cutting blade.

6. A food packaging machine as set forth in claim 5 wherein the chain conveyor includes a toothed sprocket, whereby number of teeth on the toothed sprocket determines the length of film severed by cutting blade operation.

7. A food packaging machine as set forth in claim 1 wherein the means for tensioning the means for heat sealing the food package includes means for supporting the means for heat sealing the food package.

8. A food packaging machine as set forth in claim 1 wherein the means for removing the heat sealed food package from the food packaging machine includes means for lifting the heat sealed food package from the means for retaining the food package for sealing.

9. A method of sealing a food package as set forth in claim 2 wherein the step of heat sealing the food package includes applying an internally heated roller to a portion of the heat sealable film adjacent the food package.

10. A method of sealing a food package as set forth in claim 9 wherein the the step of heat sealing the food package includes heating the roller with a radiant heat source in order to increase the roller surface temperature.

11. A method of sealing a food package as set forth in claim 2 wherein the step of removing the heat sealed package includes separating the heat sealed package from the means for retaining the food package for sealing.

12. A method of sealing a food package as set forth in claim 2 wherein the heat sealing operation is continuous.

13. A food packaging machine, comprising:

- a pin chain conveyor, the pin chain conveyor including one or more pins and chain, the pins conveyed through the food packaging machine by the chain portion of the pin chain conveyor;
- a pocket for a food package to be sealed by the food packaging machine, the pocket conveyed through the food packaging machine by the pins;
- a heat sealing system for heat sealing a heat sealable film, the heat sealing system sealing the heat sealable film on the food package conveyed through the food packaging machine to be sealed;
- a rotating cutter for cutting the heat sealable film sealing the package, the rotating cutter including a rotating cutter drive sprocket, the rotating cutter drive sprocket engaging the pin chain conveyor chain;
- a tensioning assembly for maintaining a desired tension on the heat sealable film;
- a heat sealable film core support assembly for supporting a roll of heat sealable film on a roll core, the heat sealable film core support assembly providing for removal and replacement of heat sealable film roll cores; and
- an exit portion of the food packaging machine for removal of one or more heat sealed packages.

14. A food packaging machine as set forth in claim 13, wherein the pocket for the food package includes a raised area for supporting the food package carried by the pocket.

15. A food packaging machine as set forth in claim 13, wherein the heat sealing system includes a first heat source and a second heat source.

16. A food packaging machine as set forth in claim 15, wherein the first heat source is an internally heated roller.

17. A food packaging machine as set forth in claim 16, wherein the second heat source is a radiant heat source directed toward the internally heated roller.

18. A food packaging machine as set forth in claim 13, wherein the exit portion of the food packaging machine includes an exit ramp chute assembly for separating the heat sealed food package from the pocket for the food package.

19. A food packaging machine as set forth in claim 13, wherein one or more pins extend from the conveyor chain and engage one or more openings in one or more pockets.

20. A food packaging machine as set forth in claim 13, further comprising a jam sensing assembly that detects a jam and stops the pin chain conveyor.

* * * * *